United States Patent [19]
Jones et al.

[11] Patent Number: 5,551,918
[45] Date of Patent: Sep. 3, 1996

[54] FLEXIBLE COMPOSITE COUPLING

[75] Inventors: Peter J. Jones, Erie, Pa.; Peter L. Valentine, Marion, Va.; Duncan J. Lawrie, Erie, Pa.

[73] Assignee: Lawrie Technology Incorporated, Girard, Pa.

[21] Appl. No.: 843,671

[22] Filed: Feb. 28, 1992

[51] Int. Cl.⁶ .................................................. F16D 3/50
[52] U.S. Cl. ............................ 464/80; 464/92; 464/147
[58] Field of Search ........................... 464/51, 56, 55, 464/80, 88, 87, 92, 93, 106, 147

[56] References Cited

U.S. PATENT DOCUMENTS

| | | | |
|---|---|---|---|
| 1,606,514 | 11/1926 | Crist | 464/80 |
| 2,195,993 | 4/1940 | Morrill. | |
| 3,977,273 | 8/1976 | Ernst et al. | 74/572 |
| 4,116,018 | 9/1978 | Weible. | |
| 4,391,594 | 7/1983 | Hannibal et al. | 464/80 |
| 4,569,667 | 2/1986 | Hannibal et al. | 464/51 |
| 4,577,736 | 3/1986 | Bongers et al. | 188/371 |
| 4,666,753 | 5/1987 | Matuska et al. | 428/137 |
| 4,863,416 | 9/1989 | Gupta | 464/181 |
| 4,968,286 | 11/1990 | McGuire | 464/51 |

OTHER PUBLICATIONS

Comflex® Composites, Mar. 1990, SI–6021 brochure.
Comflex® Torque Tubes, Mar. 1990, SI–6021 brochure.

*Primary Examiner*—Daniel P. Stodola
*Attorney, Agent, or Firm*—Randall S. Wayland; Richard K. Thomson; James W. Wright

[57] ABSTRACT

A flexible composite coupling (20) wherein a wound filament or roving is wound between two attachment members (22) and (24) and is fully or partially impregnated with a resin matrix such as urethane to form a flexible element (32). The attachment members (22) and (24) include radially extending flanges (26) and (28) which have a radiused periphery (30) formed on them, over which the flexible element (32) is wound. The flexible element (32) diverges inwardly from the flanges' (26) and (28) radiused periphery (30) to form opposed diaphragm portions (34) and (35) of the flexible element (32) which smoothly meet at a minimum diameter (36). Hoop winds (38) of a material with high strain capacity wrapped about this minimum diameter (36) pretension the filaments or roving within the flexible element (32).

5 Claims, 3 Drawing Sheets

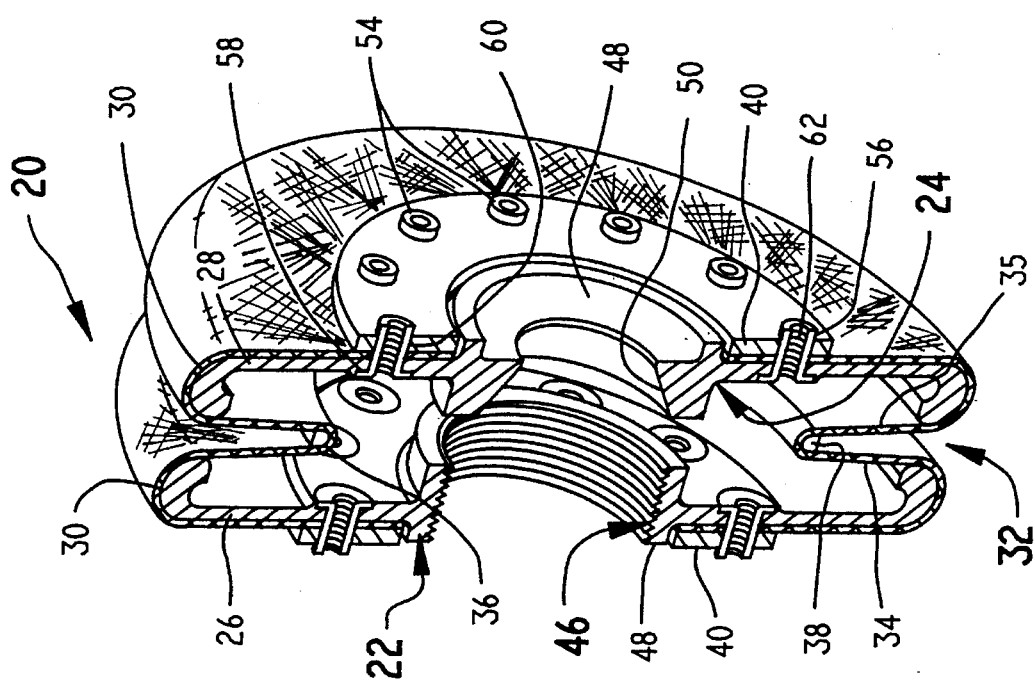
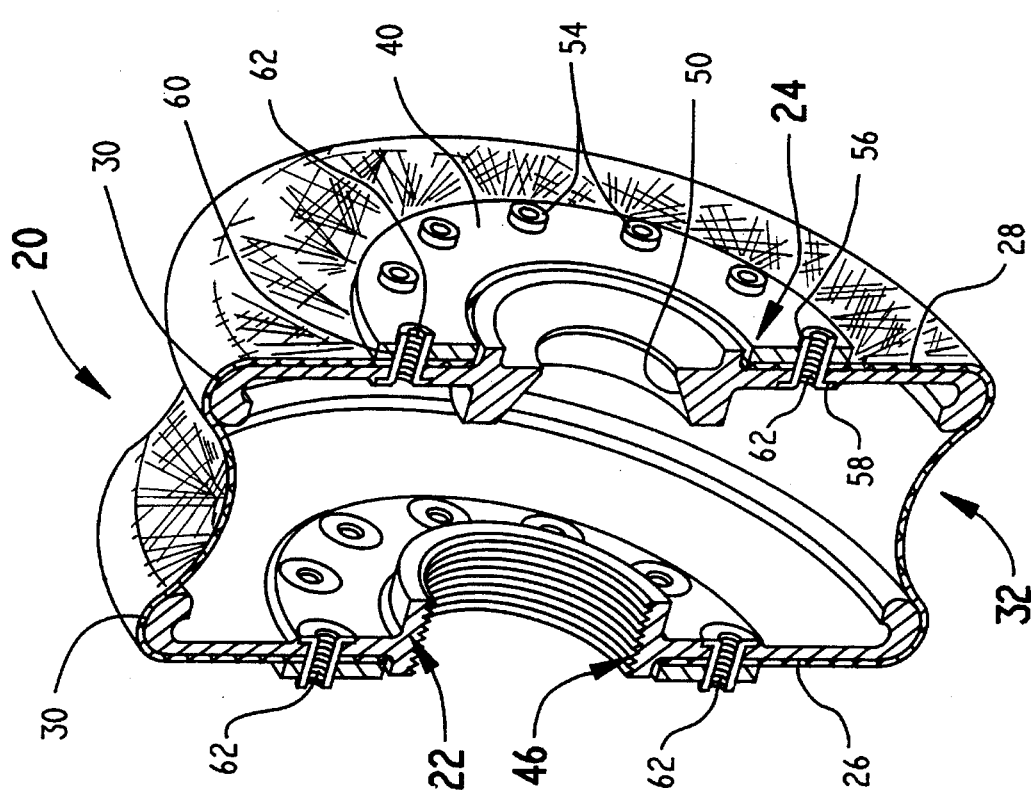

FLEXIBLE COMPOSITE COUPLING

FIELD OF THE INVENTION

The present invention relates to the area of couplings for transmission of torque between a driving and driven member, while allowing axial and cocking misalignment of the two members. Specifically, the invention relates to a flexible coupling wherein the flexible element is comprised of resin matrix and fiber reinforced construction.

BACKGROUND OF THE INVENTION

Flexible composite couplings for transmission of torque between driving and driven members have been under development for a number of years. Specifically, work has been done in the areas of increasing torque carrying capacity, increasing misalignment capability, better balancing and increasing service life of the couplings. In general, flexible composite couplings are manufactured from filamentary reinforcing material with a matrix or binder material impregnating the fibers to add form. These couplings are lightweight and very well suited for high speed applications because they require only minimal balancing. These couplings connect a driving member to a driven member and allow transmission of torque, yet simultaneously therewith, they accommodate axial misalignment and cocking misalignment of the driving member relative to the driven member.

The Morrill patent (U.S. Pat. No. 2,195,993) discloses a flexible coupling with a flexible member 15 of elastomer or fabric reinforced elastomer construction connecting to the annular flanges 13 at the outermost point thereby reducing stress on the flexible member. The Ernst et al. patent (U.S. Pat. No. 3,977,273) discloses a flywheel for an inertial guidance system comprised of one or more wound filaments such as carbon or boron with a binder such as a resin. The Weible patent (U.S. Pat. No. 4,116,018) discloses a wound composite universal joint comprising wound elongate elements or fibers preferably coated with a binder resin and at least two large diameter portions and at least one small diameter portion. Application of torque places certain load-carrying filaments substantially in tension. Shown in FIG. 1, is the connection of the flexible portion to the disks at the outermost portion, as well as a removable central universal joint. Although the Weible coupling has the benefits of being light weight and having substantial torque carrying capacity, it has cocking and axial stiffnesses that are higher than desirable. This is because it is necessary to space the large diameter portions 28 and 30 apart by a substantial distance in order to wind the coupling and this spacing results in a high axial compression component of the flexing element while undergoing cocking misalignment.

The commonly assigned Hannibal patent (U.S. Pat. No. 4,391,594) discloses a flexible coupling for transmitting torque and accommodating cocking and axial alignment. The coupling is comprised of a pair of hubs 13 and 14 and a reinforcing ring 23. A reinforcing fiber strand is wrapped from one hub 13, across the reinforcing ring 23, and to the other hub 14. The strand is impregnated with resin and wound in a geodesic path. A second commonly assigned Hannibal patent (U.S. Pat. No. 4,569,667) discloses a flexible coupling for transmitting torque and accommodating misalignment. The coupling is comprised of a pair of plates 57 and 59 with protruding pins 63 and a reinforcing ring 23. A reinforcing fiber strand is wrapped from the pins 63 on one plate 57, across the reinforcing ring 23, and to the other pins 63 on the other plate 59. The strand is resin impregnated and wound in a geodesic path. Although both these couplings exhibit soft cocking and axial stiffness and high torsional stiffness, they tend to lack the strength of the Weible '018 concept, wherein the bonds are at the maximum diameter of the coupling. Most notably, all these couplings of the Hannibal '667 and '594 and the Weible '018 all lose their initial pretension in the fibers, thus limiting the torque carrying capacity.

The Bongers et al. patent (U.S. Pat. No. 4,577,736) describes a tubular member for transmitting torque between axially spaced members. The member includes wound fiber roving material and a binding resin matrix material. A winding angle of +/−45 degrees is desirable for torsional rigidity and low bending stiffness. Matuska et al. (U.S. Pat. No. 4,666,753) discloses a composite coupling for transmitting torque between axially spaced members. The coupling includes layers of fiber material such as Kevlar® fiber and a thermosetting or thermoplastic resin matrix material such as American Cyanamid epoxy 1806. A fiber roving or tape is wound about the rim of the coupling in a circumferential manner for reinforcement in order to prevent oil-canning of the part as it is exposed to high temperatures.

The commonly assigned, Gupta patent (U.S. Pat. No. 4,863,416) discloses a composite shaft for transmitting torque between axially spaced couplings. The member includes layers of overlapped anisotropic layers each comprised of parallel filaments. Described is the winding angle of 55–65 degrees for resulting in a desirable torsional to bending stiffness ratio while reducing bending stress in the composite shaft. The commonly assigned McGuire patent (U.S. Pat. No. 4,968,286) discloses a filament wound coupling which is geodesically wrapped over a removable mandrel. The coupling 10 includes a pair of hubs 12 and 14 with a plurality of projecting pins 26, 28. The filaments 38 are wrapped in a geodesic pattern from one hub 12, over the reinforcing ring 34 and onto the other hub 14. The filaments are secured to the pins, and the pins have a threaded portion for easily accepting the driving and driven members.

All of the above couplings exhibit good performance for their intended purpose. However, it should be understood that the prior art couplings which exhibit both low axial and cocking stiffness have low torsional strength and fatigue life and, conversely, the prior art couplings which exhibit high torsional strength and fatigue life have axial and cocking stiffnesses which are too high. In addition, all prior art composite couplings tend to lose their initial fiber pretension, either during manufacture or shortly thereafter, thus limiting their torque capacity.

SUMMARY OF THE INVENTION

Therefore it is a primary object of the present invention to provide a flexible composite coupling having improved service-life over the prior art couplings, yet exhibiting low axial and cocking stiffnesses. This objective is accomplished by the addition of hoop wraps about the flexible element which pretension the flexible element.

It is another object to provide an improved flexible composite coupling which maintains the fiber pretensioning, thus maximizing the torque-carrying capacity and service-life of the coupling. This objective is accomplished by the use of compliant hoop wraps which have a high strain capacity.

It is another object to provide a composite coupling which has significantly lower axial and cocking stiffness relative to the prior art couplings of equal strength. This objective is accomplished by moving the flanges of the coupling closer together as a result of the addition of hoop wraps and processing.

It is yet another object to provide a composite coupling which has significantly higher torsional strength relative to the prior art couplings of equal cocking stiffness by maintaining the fiber pretensioning.

It is a further object to provide a low cocking stiffness flexible composite coupling which can be manufactured by a winding process and would not require a core-dissolving step.

The abovementioned and further objects, features and advantages of the present invention will become apparent from the accompanying descriptions of the preferred embodiments and attached drawings.

BRIEF DESCRIPTION OF THE DRAWINGS

The accompanying drawings which form a part of the specification, illustrate several key embodiments of the present invention. The drawings and description together, serve to fully explain the invention, wherein:

FIG. 5 is a sectioned isometric view of another embodiment of the composite coupling illustrating the as manufactured spacing of the first and second attachment means; and FIG. 6 is a sectioned isometric view of another embodiment of the composite coupling illustrating the components and their interrelationships with hoop wraps in place.

DETAILED DESCRIPTION OF THE INVENTION

Figure 1:
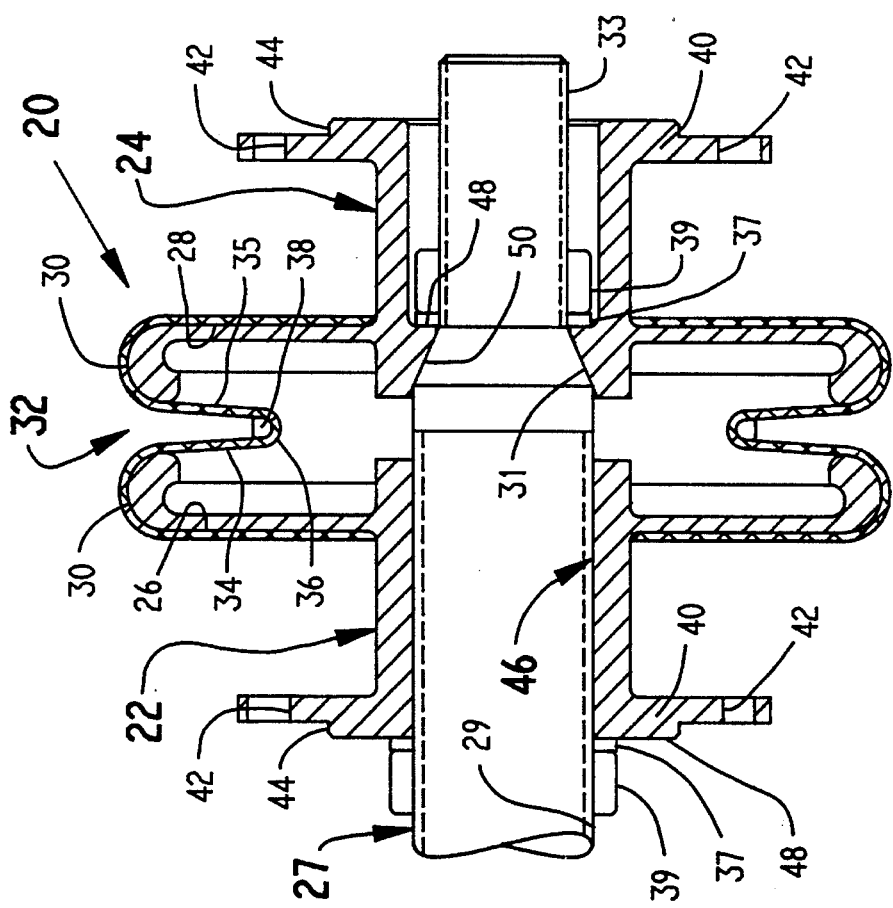
FIG. 1 is a sectional side view of one embodiment of the present invention flexible composite coupling.

Referring now to the drawings, and in particular to FIG. 1, one embodiment of the present invention composite coupling 20 is shown. The coupling 20 is comprised of a first attachment means 22 formed on a first end of the coupling and attachment means 24 formed on the other end of the coupling 20, as well as flanges 26 and 28 which extend generally in a radially outward direction from the centers of rotation of the first and second attachment means 22 and 24, respectively. Flanges 26 and 28 preferably include generally radially outwardly facing radiused peripheries 30. A connecting flange 40 is formed on the first attachment means 22 and second attachment means 24 for attaching to the driving and driven members, such as drive shafts or the like. Each of the first and second attachment means 22 and 24, respectively, include an axis of rotation, preferably about their axis of symmetry. Holes 42 arranged in a bolt pattern and a pilot 44 are formed on first and second attachment means 22 and 24, respectively, for facilitating attachment to the driving member and driven member, by way of bolts.

The key improvement relative to the prior art is the addition of one or more hoop wraps 38 about a minimum diameter 36 of the flexible element 32. The addition of the hoop wraps 38 increases the torsional strength of the coupling 20 by as much as two fold by maintaining the pretension in the opposing diaphragms 34 and 35 of the flexible element 32. It also increases the service-life by delaying the onset of micro-buckling of the fibers that are placed in compression upon application of torque and eliminates the impact loading experienced by the prior art unpretensioned couplings upon torque reversals. Addition of the hoop wraps 38 also reduces the cocking and axial stiffness of the coupling 20 by allowing the flanges 26 and 28 to be closer together. Some typical applications for this type of coupling 20 are for high speed shaft couplings including speeds of about 4000 RPM or more, specifically, tail rotor shaft couplings, engine to transmission couplings, or any other high speed application. However, the coupling 20 can also exhibit advantages at lower speeds as well. By way of example and not by limitation, this coupling 20 can accommodate torques of about 8000 in-lbs. and can accommodate cocking misalignment of up to about 5 degrees, depending on the application.

Figure 2:
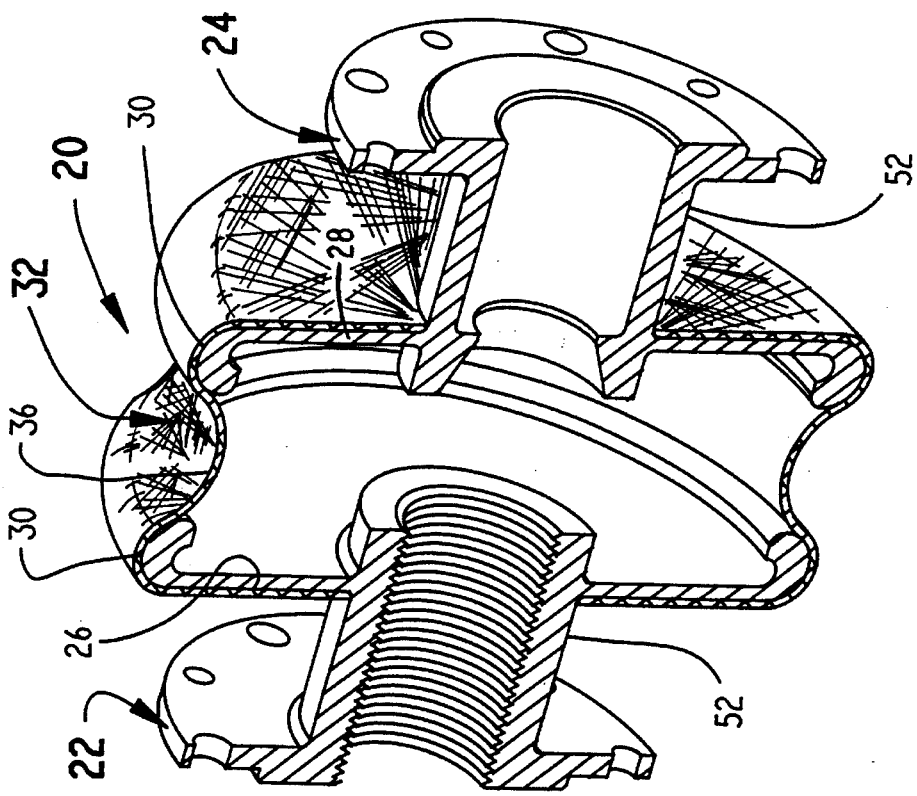
FIG. 2 is an isometric view of one embodiment of the composite coupling before the application of hoop wraps illustrating the as manufactured spacing of the first and second attachment means.

Now referring to FIG. 2, the coupling 20 is shown with the first and second flanges 26 and 28 initially spaced apart by approximately 0.70 inches (inside flange to inside flange). The flexible element 32 is geodesically wound initially at the spacing and then the two attachment means 22 and 24 are moved closer together and the hoop wraps 38 are added. These attachment means 22 and 24 are preferably manufactured from aluminum and have been anodized for corrosion protection. Referring again to FIG. 1, the manufacturing process to manufacture the coupling 20 includes placing the first and second attachment means 22 and 24 which have been sprayed an adhesive such as Lord Corporation's Chemlok® 218 adhesive onto a threaded mandrel 27 which is secured in the chuck of an automated winding machine such as an X–Y winder manufactured by En-Tec.

The mandrel 27 and secured attachment means 22 and 24 are then rotated at variable RPM as determined by a computer program and a resin impregnated roving or filament is geodesically wound to form the flexible element 32 of the coupling 20. The geodesic path essentially forms a straight line from one flange 26 to the other flange 28. The mandrel 27 used has a first large diameter threaded section 29, a smooth tapered section 31, and a second smaller diameter threaded section 33. First, the threaded section 46 of the first attachment means 22, such as the hub, is threaded onto the large threaded section 29 of the mandrel 27 and locked in place a predetermined distance from the mandrel's taper 31 with a washer 37 and jam nut 39. The washer 37 will contact the face 48 of the pilot 44 of the first attachment means 22. Locking the jam nut 39 will lock the first attachment means 22 to the mandrel 27 such that the mandrel 27 and first attachment means 22 do not rotate or move relative to each other. A spacer (not shown) can be used between the flanges 26 and 28 to determine the proper initial spacing.

The second attachment means 24 is slid over the smaller diameter threaded section 33 of the mandrel 27 until the taper 50 formed on the second attachment means 24 and the matching taper 31 formed on the mandrel 27 come into contact. The second attachment means 24 is then locked in place on the mandrel 27 by a washer 37 and jam nut 39. The washer 37 comes into contact with the face 48 on the second attachment means 24 and is locked in place with a jam nut 39. Locking the jam nut 39 will lock the second attachment means 24 to the mandrel 27 such that the mandrel 27 and second attachment means 24 do not rotate or move relative to each other.

Once the first and second attachment means 22 and 24 are positioned on the mandrel 27, the flexible element 32 can be wound which will ultimately flexibly connect the two flanges 22 and 24. As shown in FIG. 2, the flexible element 32 is preferably manufactured from S-Glass 250 yield roving or tow available from Dow Corning which is wetted with L-42 Adiprene® matrix material, a low modulus urethane available from Uniroyal. Other materials could be used for the filament roving or tow, such as graphite or carbon, E-glass, polyester, polyethylene such as Spectra™, Aramid such as Dupont Kevlar® fiber, or the like. Other materials could be used for the matrix or binder resin, such as epoxy, urethanes, silicone or thermoplastics and thermosets such as polyesters, vinyl esters, acrylics, or the like.

During the winding process, the roving or tow is impregnated with the resin via a meter mix dispenser such as a Fluidyne meter mix machine where the Adiprene® and Moca or other curative are mixed. The roving is fed through a serpentine impregnator where it is impregnated and then through a feed eye and then to the coupling 20. The wetted tow is tied off initially onto one of the shafts 52 formed on the attachment means 22 or 24 and the wetted fiber is wound at approximately three lb. of tension by a tensioner such as a Hellman tensioner. The winding starts at the shaft 52 and progresses up the face of the first flange 26 over the radiused periphery 30, through a minimum diameter 36 and onto the generally radially facing radiused periphery 30 of the second attachment means 24, down the face of the second flange 28 where it is wound tangent to the shaft 52 on the second attachment means 24. Then the process repeats itself, back and forth until an appropriate thickness of the flexible element 32 is reached. The two opposed diaphragm surfaces 34 and 35 are formed which extend radially inward from the radiused peripheries 30 to meet smoothly at the minimum diameter 36. By way of example and not limitation, the thickness of the flexible element is between about 0.025 inches and 0.10 inches thick.

During the winding process, the feed eye moves across the coupling 20 and it also moves in and out to reduce slipping of the roving. At each end, the roving comes into contact with the shaft 52 and it is tangent to the shaft 52. This coupling 20 by virtue of the one section of minimum diameter 36, eliminates the need for a dissolvable core of the prior art couplings. Of course, more than one minimum diameter 36 can be used, but this would require a dissolvable core. The geodesic winding pattern is well known to those skilled in the art. Further, similar types of winding are described in Weible U.S. Pat. No. 4,116,018 and the commonly assigned Hannibal U.S. Pat. No. 4,391,594, Hannibal U.S. Pat. No. 4,569,667 and McGuire U.S. Pat. No. 4,968,286 patents, all of which are herein incorporated by reference.

Figure 3:
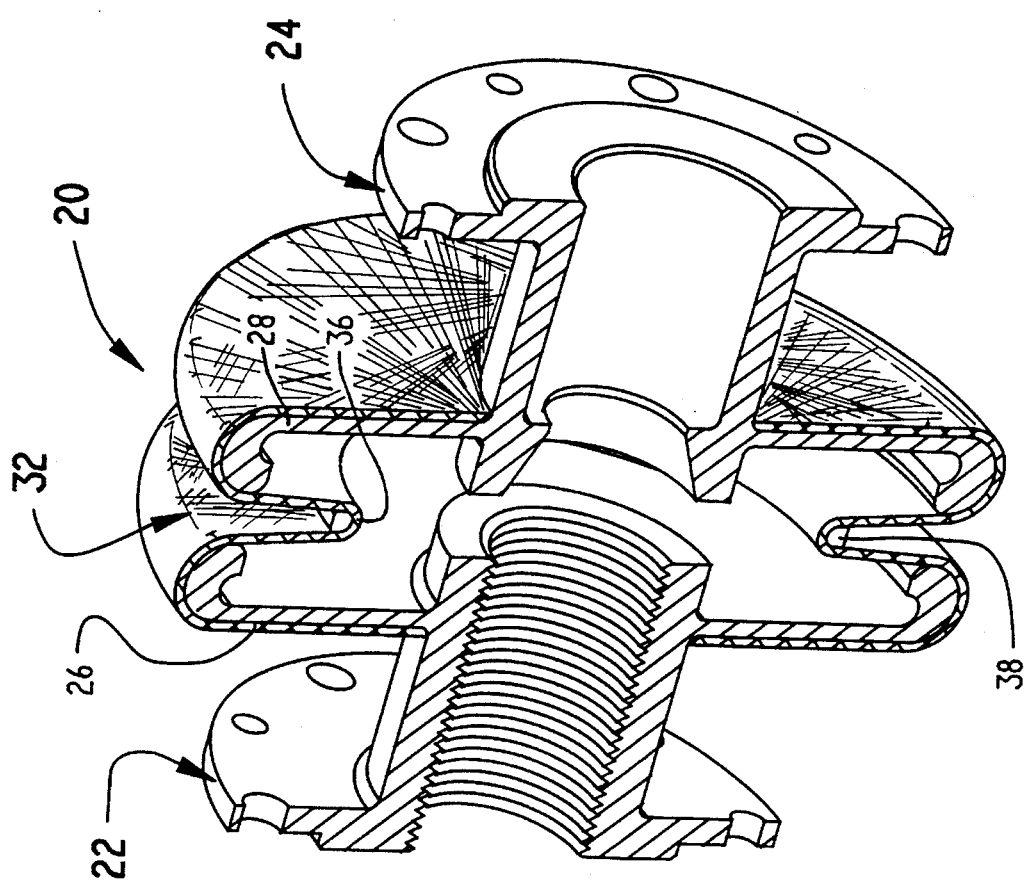
FIG. 3 is an sectioned isometric view of one embodiment of the present invention composite coupling illustrating the components and their interrelationships with hoop wraps in place.

Once the winding of the initial geodesic pattern is complete, the attachment means 22 and 24 of the coupling 20 are moved together to a spacing of 0.35 inches by rotating the entire coupling about mandrel 29 to move attachment means 22 toward attachment means 24 to a position shown in FIG. 3. A series of hoop wraps 38 are then applied about the minimum diameter 36 of the flexible element 32. These hoop wraps 38 can be of the same roving material as in the rest of the flexible element or preferably, the material forming the hoop wraps will have a high strain capacity such as exhibited by nylon monofilament. Nylon monofilament of 15 lb test is preferable. Approximately 100 wraps of the monofilament are applied under a tension of approximately 7 lb. However, more or less wraps of alternate material could be used as well.

By the addition of the hoop wraps 38, a compressive force is exerted on flexible element 32 which has the effect of drawing the flanges 26 and 28 together and pretensioning the fibers within the flexible element 32. This pretensioning prohibits the micro-buckling which causes premature failures of the prior art couplings at lower values of torque. Once the winding operation is complete, the coupling 20 and mandrel assembly is placed in an oven and cured for about 16 hours at 212° F. Other curing methods are acceptable as well, such as irradiation. After that, the mandrel is removed and the final product is complete. By way of example and not limitation, typical dimensions of the coupling 20 include an outer flange diameter of 6.0 inches, a metal flange thickness of 0.5 inches, a flange radius of 0.25 inches, an outer shaft diameter of 2.00 inches, and a thread in threaded section 46 of 1.500–12 UNF.

Figure 4:
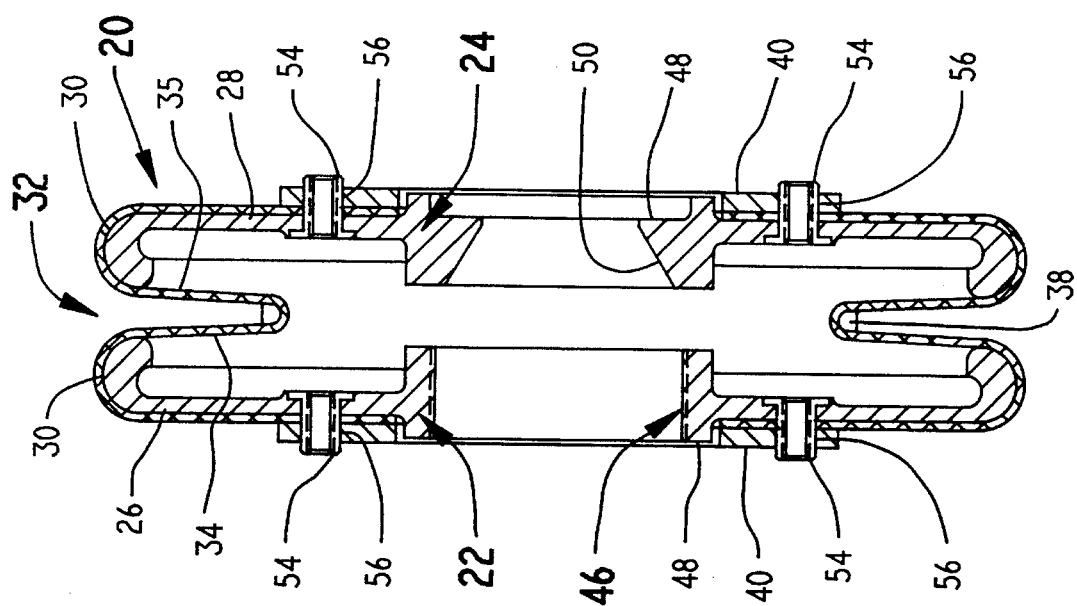
FIG. 4 is a sectional side view of another embodiment of the composite coupling illustrating another form of first and second attachment means.

Referring now to FIG. 4, wherein another embodiment of the coupling is illustrated, coupling 20 comprises a first attachment means 22 and a second attachment means 24 and a flexible element 32 wound in between the two attachment means 22 and 24. Hoop wraps 38 act to pretension the individual fibers in the flexible element 32. The attachment means 22 and 24 are similar to the first embodiment in that both embodiments include a first flange 26 and second flange 28, radiused peripheries 30, connecting flanges 40 with a bolt pattern, threaded section 46, taper 50 and faces 48. The attachment means 22 and 24 differ from the first embodiment in that they includes pins 54 and each has a significantly shorter hub portion. This embodiment is intended to lower the overall length of the coupling 20.

As shown in FIG. 5, pin 54 has an outer diameter 56 which is press fitted into a recess 58 in the flanges 26 and 28. During the winding process, the roving is wound about the pins 54 which keep the roving from slipping and provide additional support. Once the coupling 20 is geodesically wound and before the flanges are moved together and the hoop wraps 38 are added, the two connecting flanges 40 is pressed over their respective pins 54. A bore 60 formed in the connecting flange 40 press fits with the outer diameter 56 of each pin 54 to retain connecting flange 40 in place. The connecting flange 40 squeezes the wetted fibers of the flexible element 32 and forms an integral connection to the flange 26 and 28 and to the driving and driven members. The threads 62 formed on the interior of pins 54 allow easy connection to the driving and driven members. As in the previous embodiment, the coupling 20 includes flexible element 32 formed by winding a filament or roving from pin 54 across a face of flange 26 on first attachment means 22, over the periphery 30 through minimum diameter 36, over the periphery 30 on second attachment means 24, across the face of flange 28 and next to pin 54 on second attachment means 24. The process continues back and forth until the appropriate thickness and coverage is achieved. It should be noted that a continuous filament is preferable.

FIG. 6 shows the second embodiment of coupling 20 in its finished configuration when flanges are 26 and 28 are moved together and hoop wraps 38 are applied in the same manner as the previous embodiment. The key elements of both embodiments of coupling 20 are the first and second attachment means 22 and 24, the flexible element 32, and hoop wraps 38. Also included in both embodiments are the radiused peripheries 30, the minimum diameter 36, the threaded section 46 and taper 50, the faces 48, the opposed diaphragms 34 and 35 and connecting flanges 40. The pins 54 including threads 62, outer diameter 56, recess 58 and bore 60 are unique to the shorter coupling 20.

In both embodiments of the present invention, the flexible element 32 can be fiber only in a partial portion, or in other words, the element 32 is dry wound and resin is infused only in the region at or near the flanges. The resin impregnation will form the bond which fastens the flexible element 32 to the first and second attachment means 22 and 24. This could be done in a secondary resin impregnating step where the wound coupling 20 is placed in a mold and resin is injected near the flanges 26 and 28 only. A tight bead in the mold will eliminate resin impregnation in any area other than at the flanges 26 and 28.

In essence, the dry fibers in the flexible element 32 will provide a cocking stiffness which is essentially zero and eliminate the chance of any of the fibers buckling and initiating a failure. In other words, you cannot push a rope. The dry flexible element 32 has the advantage of improving the torque carrying capacity relative of the fully-impregnated coupling 20. Hoop wraps 38 can be added at the minimum diameter 36 of the flexible element 32 to add stability to the dry-wound coupling 20; however, they are not required.

While various embodiments of the present invention have been described in detail, various modifications, alterations, changes and adaptations to the aforementioned may be made without departing from the spirit and scope of the present invention defined in the appended claims. It is intended that all such modifications, alterations and changes be considered part of the present invention.

What is claimed is:

1. A coupling for transmitting torque and accommodating axial and cocking misalignment between a driving member and a driven member, comprising:
    a) a first attachment means formed on a first end of said coupling adapted to be attached to one of said driving member and said driven member, said first attachment means including a first flange extending generally outward from an axis of rotation of said first attachment means and further including a radiused periphery formed on said first flange at the largest diameter of said first flange;
    b) a second attachment means formed on a second end of said coupling adapted to be attached to another of said driving member and said driven member, said second attachment means including a second flange extending generally outward from an axis of rotation of said second attachment means and further including a radiused periphery formed on said second flange at the largest diameter of said second flange;
    c) a composite flexible element further including a wound filament impregnated with a resin matrix defined by at least two opposed diaphragm surfaces extending substantially radially inward from said radiused periphery formed on said first flange and said radiused periphery formed on said second flange to meet at a minimum diameter; and
    d) pretensioning means in the form of at least one hoop wrap wound about said minimum diameter on said composite flexible element for pretensioning said flexible element;
    whereby the torque carrying capacity and service-life of said coupling is increased by prohibiting micro buckling of said wound filament.

2. A coupling for transmitting torque and accommodating axial and cocking misalignment between a driving member and a driven member in accordance with claim 1 wherein said flexible element of said coupling further includes a partial portion of said flexible element which contains only dry fibers.

3. A coupling for transmitting torque and accommodating axial and cocking misalignment between a driving member and a driven member, comprising:
    a) a first attachment means formed on a first end of said coupling adapted to be attached to one of said driving member and said driven member, said first attachment means including a first flange extending generally outward from an axis of rotation of said first attachment means and further including a radiused periphery formed on said first flange at the largest diameter of said first flange;
    b) a second attachment means formed on a second end of said coupling adapted to be attached to another of said driving member and said driven member, said second attachment means including a second flange extending generally outward from an axis of rotation of said second attachment means and further including a radiused periphery formed on said second flange at the largest diameter of said second flange;
    c) a flexible element defined by at least two opposed diaphragm surfaces extending substantially radially inward from said radiused periphery formed on said first flange and said radiused periphery formed on said second flange to meet at a minimum diameter; and
    d) pretensioning means in the form of at least one hoop wrap wound about said minimum diameter on said flexible element for pretensioning said flexible element, said at least one hoop wrap being compliant and exhibiting a high strain capability;
    whereby the torque carrying capacity and service-life of said coupling is increased and pretension in said coupling is maintained.

4. A coupling for transmitting torque and accommodating axial and cocking misalignment between a driving member and a driven member in accordance with claim 3 wherein said first attachment means and said second attachment means have a bolt pattern for attaching to said driving and said driven members formed thereon.

5. A coupling for transmitting torque and accommodating axial and cocking misalignment between a first component and a second component, comprising:
    a) a first attachment means formed on a first end of said coupling adapted to be attached to one of said driving member and said driven member, said first attachment means including a first flange extending generally outward from an axis of rotation of said first attachment means and further including a radiused periphery formed on said first flange at the largest diameter of said first flange;
    b) a second attachment means formed on a second end of said coupling adapted to be attached to another of said driving member and said driven member, said second attachment means including a second flange extending generally outward from an axis of rotation of said second attachment means and further including a radiused periphery formed on said second flange at the largest diameter of said second flange;
    c) a flexible element defined by at least two opposed diaphragm surfaces including only dry wound filaments extending substantially radially inward from said radiused periphery formed on said first flange and said radiused periphery formed on said second flange to meet at a minimum diameter;

d) at least one hoop wrap wound about said minimum diameter on said flexible element for pretensioning said flexible element; and e) a matrix material interspersed with said dry wound filaments in the proximity of said radiused periphery of said first flange and said radiused periphery of said second flange for providing a bond to said first flange and second flange.

* * * * *